United States Patent
Hunt et al.

(10) Patent No.: US 7,164,346 B2
(45) Date of Patent: Jan. 16, 2007

(54) ROUTING DEVICE AND METHOD FOR A POWERLINE NETWORK

(75) Inventors: Bernard Hunt, Redhill (GB); Richard M. Miller-Smith, Lingfield (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 573 days.

(21) Appl. No.: 10/135,342

(22) Filed: Apr. 30, 2002

(65) Prior Publication Data
US 2002/0163425 A1 Nov. 7, 2002

(30) Foreign Application Priority Data
May 3, 2001 (GB) ................................. 0110845.5

(51) Int. Cl.
*G05B 11/01* (2006.01)
(52) U.S. Cl. .................................. 340/310.11; 370/351
(58) Field of Classification Search ........... 340/310.01, 340/310.06, 310.08, 538, 310.11, 310.16, 340/310.18, 538.15, 538.17; 370/229, 230, 370/235, 351, 357, 359, 360, 381, 386, 464; 725/78–80, 82
See application file for complete search history.

(56) References Cited

U.S. PATENT DOCUMENTS

| 6,107,912 A | 8/2000 | Bullock et al. ........ 340/310.01 |
| 6,130,896 A * | 10/2000 | Lueker et al. ............... 370/469 |
| 6,151,330 A * | 11/2000 | Liberman .................... 370/449 |
| 6,526,581 B1 * | 2/2003 | Edson .......................... 725/74 |
| 2001/0045888 A1 * | 11/2001 | Kline .................... 340/310.01 |
| 2001/0046288 A1 | 11/2001 | Grimes ........................ 379/322 |

FOREIGN PATENT DOCUMENTS

| EP | 0852419 | 7/1998 |
| WO | 0109739 | 2/2001 |
| WO | 0154297 | 7/2001 |

OTHER PUBLICATIONS

"Network Connection—Beware of the PL Trail—Multiple protocols may help keep wires from crossing" by serge Mathieu Apr. 2000, pp. 1-4.
Main.net Communication—Broadband PLC Solutions—Products—Building Bocks and Products—pp. 1-6.
B. E. Markwalter et al; "Cebus Router Testing", Proceedings of the International Conference on Consumer Electronics, (ICCE), Rosemont, Jun. 5, 1991, New York, IEEE, vol. Conf. 10, pp. 90-91 XP010284373.
Yang Yaesoo et al; "Performance Evaluation of a Three Priority Cebus Router", IEEE Transactions on Consumer Electronics, IEEE Inc. New York, vol. 39, No. 2, May 1, 1993, pp. 107-114, XP000378513.

* cited by examiner

*Primary Examiner*—Thomas Mullen
(74) *Attorney, Agent, or Firm*—Larry Liberchuk

(57) ABSTRACT

An internal powerline network is provided with a routing device for routing a signal on only a part of the network. In this way the data capacity of the network is increased. The routing device is advantageously attached to the fuse box of the powerline network.

9 Claims, 2 Drawing Sheets

ROUTING DEVICE AND METHOD FOR A POWERLINE NETWORK

This invention relates to apparatus for and a method of routing signals on an internal powerline network. An internal powerline network is one that is substantially within a single premise.

It is known to use a powerline network to carry analogue and digital data signals. The data may be, for example, audio, visual and/or control signals. An example of such a network is described in U.S. Pat. No. 6,107,912. However an internal powerline network has a fairly limited capacity for carrying such signals. When the number of units connected to an internal powerline network reaches a certain level the total data traffic can surpass the capacity of the network.

It is therefore an object of the invention to improve the routing of signals on an internal powerline network.

According to a first aspect of the present invention, there is provided apparatus for routing signals on an internal powerline network comprising a routing device for transmitting a signal on only a part of said network.

According to a second aspect of the present invention, there is provided a method of routing signals on an internal powerline network comprising receiving a signal at a routing device and transmitting said signal on only a part of said network.

Owing to the invention, it is possible to increase the data capacity of an internal powerline network.

Advantageously, the routing device is connected to the fuse box/circuit breaker of the powerline network. Most premises have distinct circuits for different parts of the premise, such as different floors and different lighting circuits, and the routing through the fuse box can easily take advantage of this.

Figure 1:
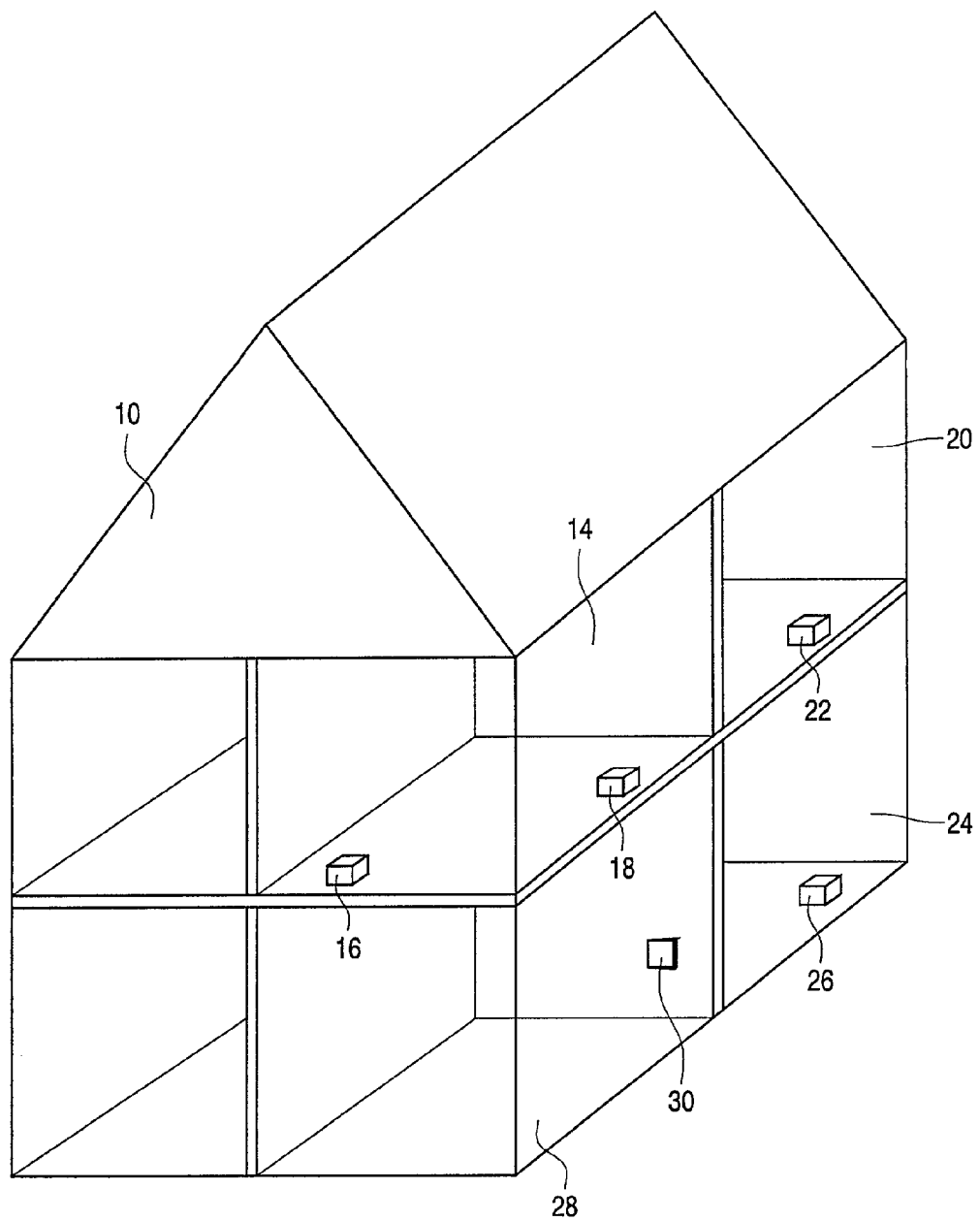
Figure 2:
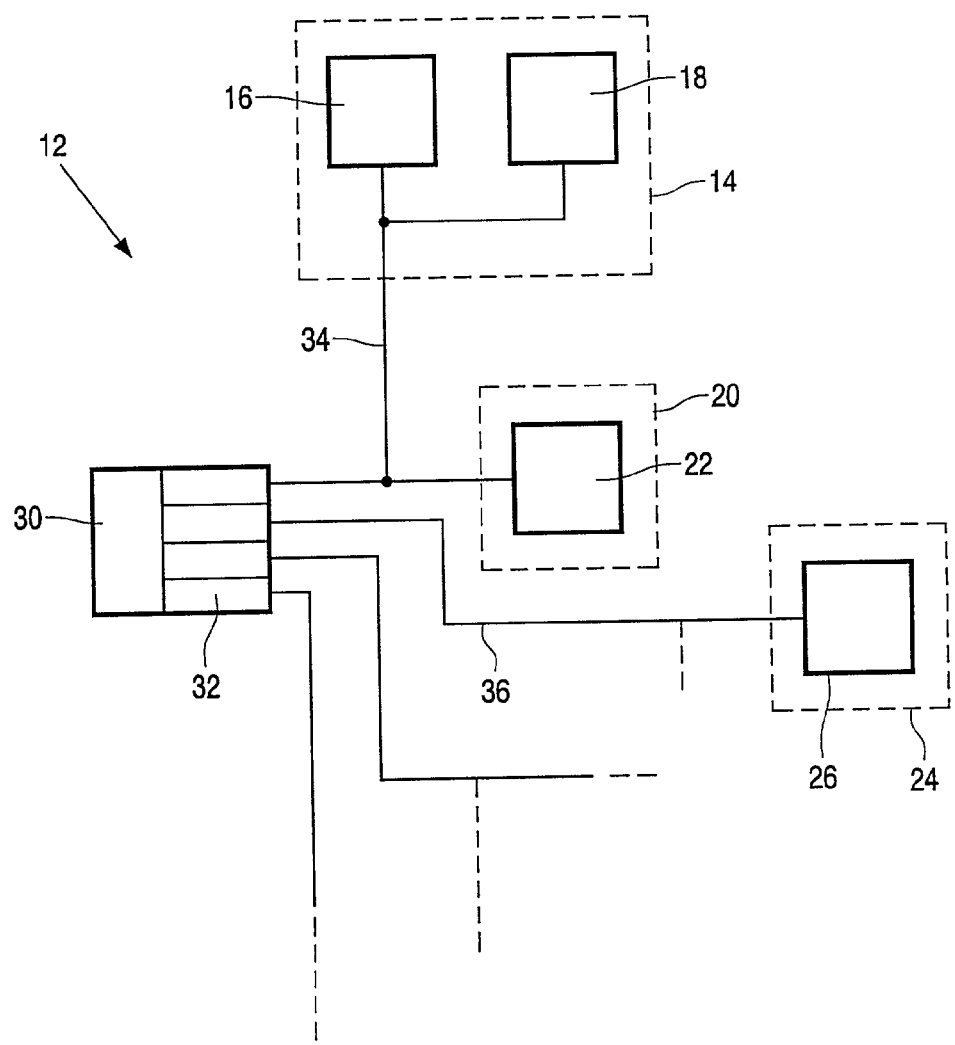
Figure 3:
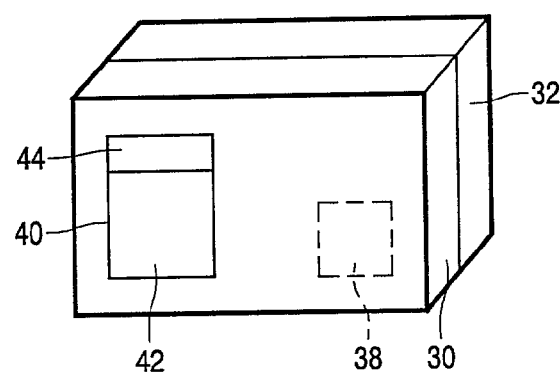

Embodiments of the invention will now be described, by way of example only, with reference to the accompanying drawings, in which:

FIG. 1 is a schematic view of a house with a number of units connected to an internal powerline network, FIG. 2 is a diagram of a portion of the powerline network, and FIG. 3 is a schematic view of a routing device connected to a fuse box.

In the Figures, a house 10 is provided with an internal powerline network 12 that, in addition to supplying power to units around the house 10, carries data signals to and from those units. These data signals are typically audio, visual and/or control signals. A control signal is one that, for example, turns a unit on or off. The method of transmitting such data signals on a powerline network is well known in the art.

In an upstairs room 14 two such units are present, being a PC 16 and a television 18 (both shown schematically in FIG. 1). In a second upstairs room 20 is a second television 22. In a downstairs room 24 is a third television 26. In another downstairs room 28 is a routing device 30 connected to the fuse box 32.

The routing device 30 can receive a signal via the powerline network 12 and can route that signal by transmitting it on only a part of the network 12. The routing device 30 creates data isolation between the circuits of the network 12 so that signals on one circuit do not necessarily appear on other circuits.

The routing device 30 includes within it a storage device 38 that stores details of the units connected to the powerline network 12 and also details of the circuit of the network 12 on which each unit is located. This information can be programmed into the storage device 38 via a user interface 40 comprising keypad 42 and display 44 on the routing device 30 or the routing device 30 can periodically refresh the network 12 to determine which units are connected to the network 12 and their location. Other methods of keeping the information in the storage device 38 current are possible. For example each unit can be so arranged that when it is switched on at the mains it sends identifying information to the routing device 30 via the powerline network 12. This system has the advantages that there is not the extra signal traffic of periodic refreshes, nor is there a requirement for any user input, but the information held by the storage device 38 is up to date. The units and the routing device 30 can operate an ethernet address system as the means for identifying and locating units on the network 12.

When a unit wishes to send a signal via the network 12 to a second unit in the house 10 it will attach an identifier unique to the destination unit to the signal. This identifier is read by the routing device 30 which routes the signal (using information from the storage device 38) via the fuse box 32 onto the individual circuit on which the second unit is located. The routing device 30 can signal to the first unit that the signal has been correctly routed. For example if a user is playing a DVD on the PC 16 and also wishes to send the DVD signal to the television 26 in the downstairs room 24 then the routing device 30, upon receipt of the DVD signal on the circuit 34 will transmit that signal via the fuse box 32 and circuit 36 to the television 26. If the user, as an alternative, had wanted to send the signal to the television 22 then the routing device 30 would not have retransmitted the signal as the television 22 is already present on the circuit 34 and would receive the DVD signal without any need for the routing device 30 to take any action.

The routing device 30 can also be connected to networks external to the house 10, for example, to the Internet. The device 30 can be the connection point between the powerline network 12 and the external network and would therefore route the signals received from the external network onto the appropriate internal circuit. Alternatively, the powerline network 12 can also be connected to external networks via a unit on the powerline network 12. For example, the PC 16 may be connected to the Internet via a telephone line and a modem.

As can be seen from the above examples, by using the routing device 30 the total amount of data signals transmitted over the whole network 12 is reduced and any transmission delay, due, for example, to data collisions and retransmissions, is reduced. This results in the network 12 being able to carry a greater bandwidth of signals than would otherwise be possible. The routing device 30 ensures that each circuit only carries signals which commence or terminate with that circuit.

The invention claimed is:

1. A routing device, connected to a fuse box that electrically distinguishes a plurality of powerline circuits that form an internal powerline network, said device configured to create data isolation between the plurality of powerline circuits to transmit a signal on selected ones of said plurality of powerline circuits.

2. The device of claim 1, said device further comprising a storage device for storing details of units connected to said powerline network.

3. The device of claim 2, further comprising a user interface for programming information into the storage device.

4. The device of claim 2, wherein said device is arranged to:

receive identifying information from each of the units when said units are switched on to said powerline network; and identify a powerline circuit of the plurality of powerline circuits to which each of the units is connected.

5. An apparatus for routing signals on an internal powerline network, the apparatus comprising:

a routing device for transmitting a signal on selected ones of a plurality of powerline circuits forming said powerline network; and a storage device for storing details of units connected to said powerline network and details of the powerline circuits to which the units are connected, wherein said routing device is arranged to periodically refresh said powerline network to determine the units connected to said powerline network.

6. A method for routing signals on an internal powerline network, said method comprising:

receiving a signal;

transmitting the received signal to selected ones of a plurality of powerline circuits forming said powerline network, such that data isolation is created among the plurality of powerline circuits;

storing details of each unit connected to said powerline network; and connecting a routing device to a fuse box of said powerline network.

7. The method according to claim 6, further comprising programming details of the units connected to said powerline network into a storage device.

8. The method according to claim 6, further comprising:

receiving identifying information from said units when said units are switched on to said powerline network; and identifying a powerline circuit of the plurality of powerline circuits to which each of the units is connected.

9. A method of routing signals on an internal powerline network composed of a plurality of electrically distinct powerline circuits, comprising:

receiving a signal and transmitting said signal on selected ones of the plurality of powerline circuits;

storing details of units connected to said powerline network and details of the plurality of powerline circuits to which the units are connected; and periodically refreshing said powerline network to determine the units connected to said powerline network.

* * * * *